United States Patent [19]

Beckmann et al.

[11] Patent Number: 4,794,249
[45] Date of Patent: Dec. 27, 1988

[54] OPTICAL TIME DOMAIN REFLECTOMETER WITH HETERODYNE RECEPTION

[75] Inventors: Friedrich-Karl Beckmann, Pinneberg; Wolfgang Hoppe, Norderstedt; Reinhard Knöchel, Elmshorn; Jürgen Kordts, Wedel, all of Fed. Rep. of Germany

[73] Assignee: U.S. Philips Corporation, New York, N.Y.

[21] Appl. No.: 26,797

[22] Filed: Mar. 17, 1987

[30] Foreign Application Priority Data

Mar. 20, 1986 [DE] Fed. Rep. of Germany ....... 3609371

[51] Int. Cl.$^4$ .............................................. H01J 5/16
[52] U.S. Cl. .................................... 250/227; 356/73.1
[58] Field of Search ................ 250/227; 455/610–612, 455/609; 356/73.1

[56] References Cited

U.S. PATENT DOCUMENTS 4,708,471 11/1987 Beckmann et al. ................ 356/73.1

Primary Examiner—David C. Nelms
Assistant Examiner—Khaled Shami
Attorney, Agent, or Firm—Paul R. Miller

[57] ABSTRACT

The invention relates to an optical time domain reflectometer (OTDR) with heterodyne reception for determining the attentuation of an optical waveguide (measuring waveguide) by measuring the back-scattered portion of light pulses sent into the measuring waveguide. This structure is comprised of a modulated laser light source sending a send beam into the measuring waveguide and a laser light source which constitutes a local oscillator and transmits continuous light, on whose light of a wavelength differing by an intermediate-frequency from the back-scattered light from the transmission light source is superposed and is applied to a photodetector having an intermediate-frequency electric output signal which is filtered and evaluated. To improve the signal-to-noise ratio it is provided that the transmission light source is a transmission laser 1 whose light is influenced in consecutive time intervals ($t_1$ to $t_2$) such that the light frequency varies between two cut-off frequencies $f_{L1}$ and $f_{L2}$ and that the light source forming the local oscillator is a laser transmitting light at a frequency $f_{LO}$, which is located outside the range between the cut-off frequencies $f_{L1}$ and $f_{L2}$ and differs from a frequency value ($f_{LM}$), located between the frequencies $f_{L1}$ and $f_{L2}$, by the intermediate frequency ($F_{ZF}$).

18 Claims, 2 Drawing Sheets

OPTICAL TIME DOMAIN REFLECTOMETER WITH HETERODYNE RECEPTION

The invention relates to an optical time domain reflectometer (OTDR) with heterodyne reception for determining the attenuation of an optical waveguide (measuring waveguide) by measuring the back-scattered portions of light pulses transmitted in the optical waveguide, comprised of a modulated laser light source sending a send beam into the optical waveguide and a laser light source which constitutes a local oscillator and transmits continuous light, on whose light of a wavelength, differing by an intermediate frequency, the back-scattered light of the transmission light source is superposed and is applied to a photodetector whose intermediate-frequency electric output signal is filtered and evaluated.

In an arrangement of this type, disclosed in ECOC 83, "9th European Conference on Optical Communication", pages 177 to 180, a single laser-light source is used from whose light beam a partial beam is tapped for forming the local oscillator. The residual beam is sent with a time shift into the measuring optical waveguide by an acousto-optical modulator (AOM) at a frequency which is shifted by an acoustic intermediate frequency. As the laser simultaneously produces the local oscillator beam it must transmit continuous light. With lasers of this type it is however only possible to obtain light outputs which are less than can be obtained with pulsed lasers since they can be used for directly detecting arrangements without heterodyne reception. The improvement in the signal-to-noise ratio (S/N) obtainable by means of the heterodyne principle is partly lost because of the fact that on the one hand a portion of the transmission intensity must be tapped-off for the local oscillator beam and that on the other hand lasers which transmit continuous light have relatively low optical output powers.

The invention has for its object to improve the signal-to-noise ratio in an arrangement of the type defined in the opening paragraph.

This object is accomplished in that the first light source is a transmission laser 1 whose light is influenced such that in consecutive time intervals ($t_1$ to $t_2$) the light frequency varies between two cut-off frequencies $f_{L1}$ and $f_{L2}$, and that the light source forming the local oscillator is a laser transmitting light at a frequency $f_{Lo}$ which is located outside the range between the cut-off frequencies $f_{L1}$ and $f_{L2}$ and differs from a frequency value located between the frequencies $f_{L1}$ and $f_{L2}$ by an amount equal to the intermediate frequency.

Since the light required for the local oscillator is produced by its own laser, the light power of the transmission laser sent into the measuring waveguide is not reduced by the power of the local oscillator. In addition, a pulsed-mode operation is possible for the transmission laser. Consequently, it is possible to transmit pulses of a significantly higher intensity than is possible with continuous wave lasers.

For the "chirp" (frequency variation versus time) of the transmission laser, which "chirp" is provided in accordance with the invention, it is not necessary to stabilize the frequency of the transmission laser and more specifically the differential frequency for the local oscillator (Lo) laser, so that the considerable cost and design effort for control are not necessary. Only the frequency $f_{Lo}$ of the Lo-laser is to be stabilized.

Anyway, the cut-off frequencies $f_{L1}$ and $f_{L2}$ of the transmission laser must be coarsely stabilized. The cut-off frequencies can be sufficiently spaced from a frequency range located between them, which is used to form evaluatable back-scatter pulses. The transmission laser then always passes through a frequency range of a bandwidth $\Delta f_{ZF}$, which, after the frequency $f_{Lo}$ of the local oscillator has been superimposed on it, results in an intermediate-frequency output signal at the bandpass filter.

The frequency of the transmission laser beam can be varied versus time in any optional manner. A preferred, particularly single solution, however, is the solution in which the control current of the transmission laser is monotonicly changed for each back-scatter pulse between two time intervals $t_1$ and $t_2$. Then the laser property is, (which as such is an unwanted property), such that its transmission frequency depends to a low extent, but for the present invention to an adequate extent, on the electric control current. Customary laser diodes have useful "tuning transconductances" of 100 MHz/mA to 3 GHz/mA.

The variation versus time of a "chirp" of the transmission laser which can be accomplished by, for example, a corresponding variation versus time of the electric control current, must increase or decrease monotonicly, so that, during a finite period of time a send energy is passed into the measuring waveguide whose back-scatter portions form, after the Lo-frequency $f_{Lo}$ has been superimposed on them, an intermediate-frequency portion which can be removed by the bandpass filter.

A particularly simple solution using a pulsed transmission laser is obtained when the control current of the transmission laser is controlled from "zero" to a maximum value between the instants $t_1$ and $t_2$.

Uniformly spaced consecutive send pulses are obtained because of the fact that the control current of the transmission laser is amplitude-modulated. Then, both when the control current increases or decreases during passing through the frequency range $\Delta f_{ZF}$, evaluatable pulses are produced. The minimum value of the energizing current must be so small that at this value, compared with the maximum energization, a substantially disregardable thermal load of the laser is obtained.

A particularly advantageous embodiment of the invention is characterized in that the light beam of the transmission laser is guided into the measuring waveguide via a first optical isolator and through a first direct path of an optical fiber coupler, and that the light beam of the Lo-laser in the return direction is guided via a second optical isolator and through the second direct path of the first optical fiber coupler.

When one wants to avoid the use of optical isolators such as they must be used in unbound-mode radiation techniques, a preferred embodiment of the invention is possible which is characterized in that the light beam of the transmission laser is guided into the test-wave guide via a direct path of a first fiber coupler, and that a portion of the optical back-scatter signal derived from the first fiber coupler is guided, combined with the light beam of the Lo-laser, to the optical detector via a second fiber coupler. In this situation, it is advantageously possible to recover in a simple manner synchronizing pulses for the evaluation of the back-scatter signal by providing that a partial beam, tapped from the light beam of the transmission laser, has superposed on it a portion of the Lo-laser light beam and is applied to a second photodetector whose electric output signals trigger the circuit which evaluates the back-scatter pulses.

To reduce the pulse period of the transmission laser it is advantageous for deviations of the chirp range between the cut-off frequencies $f_{L1}$ and/or $f_{L2}$ of the transmission laser to be reduced by a control circuit. Then the total overall pulse duration of the transmission laser needs only to be a little longer than the desired duration of the transmission of evaluatable frequency components.

An advantageously implementable embodiment of the invention is characterized in that the difference between the cut-off frequencies $f_{L1}$ and $f_{l2}$ has a value between 300 MHz and 2 GHz. In addition, it is advantageous that the intermediate frequency $f_{ZF}$ has a value between 0.5 and 15 GHz.

If so required, the bandwidth of the bandpass filter at the receiver end, which determines the transmission period of evaluatable transmission frequencies, can be reduced because of the fact that it is in the form of a tracking filter.

The invention and its advantages will now be described in greater detail with reference to advantageous embodiments shown in the accompanying drawings.

Figure 1:
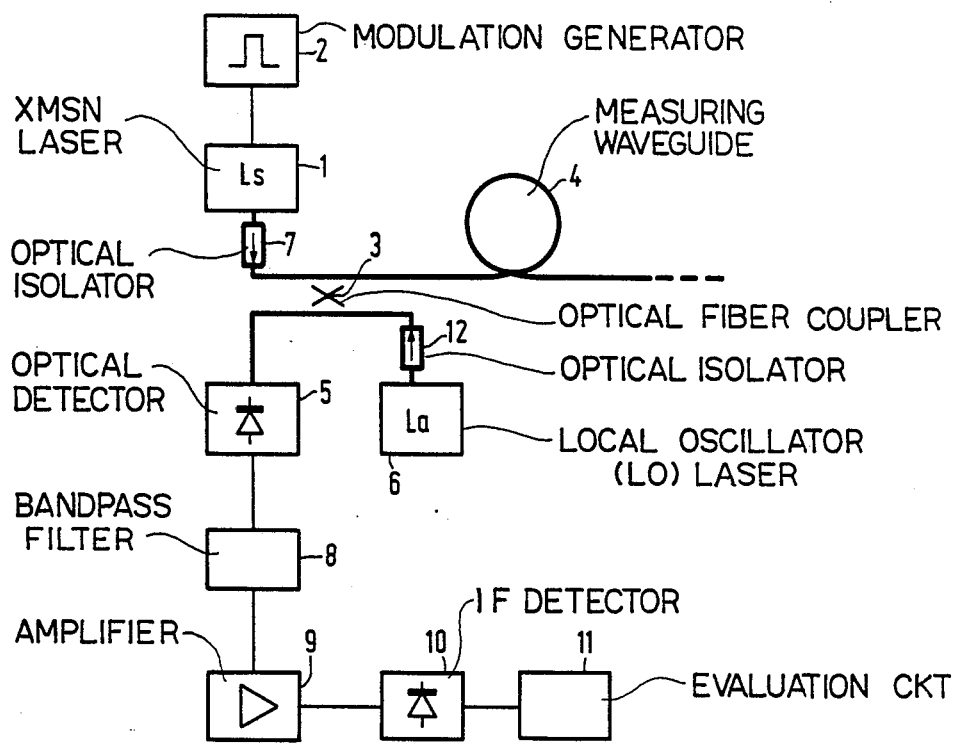
FIG. 1 shows an embodiment of the invention.
Figure 2:
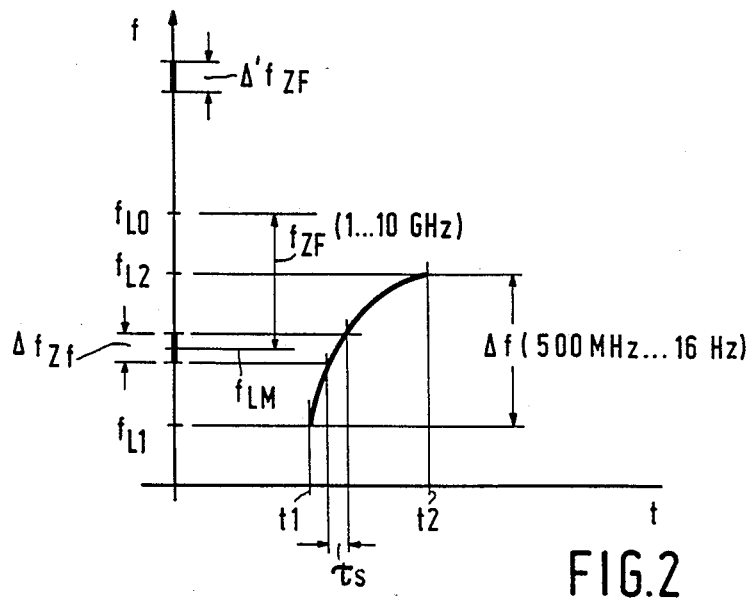
FIG. 2 shows the "chirp" variation of a transmission laser.

The frequency of the transmission laser 1 is temporarily controlled by the modulation generator 2, while the energizing current of the laser 1 is correspondingly changed. The laser 1 can, for example, be controlled from the off-state to the on-state between the instants $t_1$ and $t_2$. It can however alternatively be switched to and fro or be continuously modulated between two operating modes with a predetermined time variation of the control current. In each case the laser 1 has between the cut-off instants $t_1$ and $t_2$ a monotonic frequency "chirp" from $f_{L1}$ to $f_{L2}$ or also in the opposite direction. During the interval from $t_1$ to $t_2$ the transmission laser 1 sends light power into the measuring waveguide 4 via the optical isolator 7 and the fiber coupler 3, which preferably is a 3 db coupler. Each energy portion $\Delta P/\Delta f$ produces independently a back-scatter signal. Portions of the signals back-scattered during the interval from $t_1$ to $t_2$ are applied to the optical detector 5 (photo diode) via the fiber coupler 3 together with the local oscillator beam transmitted by the Lo-laser 6 via the optical isolator 12. The optical isolator 7 prevents interfering light portions of the Lo-laser from reaching the transmission laser via the coupler 3. Inversely, the optical isolator 12 prevents light from the transmission laser from reaching the Lo-laser.

The electric output signal of the photodetector 5 contain intermediate-frequency portions. As soon as the frequency thereof becomes located within the tuned passbandwidth of the bandpass filter 8 during a time interval $\tau_s$ located between the instants $t_1$ and $t_2$, a signal appears at the output of the bandpass filter 8, which is amplified in the amplifier 9 and applied to an intermediate-frequency detector 10 whose output signal contains information about the local variation of the attenuation of the measuring waveguide 4 and is evaluated and indicated in a customary manner by the evaluation circuit 11.

The mode of operation of the invention will now be described in greater detail with reference to the variation of the frequency f of the transmission laser 1 in the time interval between $t_1$ and $t_2$. For the formation of a back-scatter pulse the transmission laser 1 is in the switched-on state during the interval $t_1$ to $t_2$. This may be accompanied by a corresponding control of the control current of the transmission laser 1 by a variation of the transmission frequency f in accordance with the characteristic curve shown, which increases monotonicly from the cut-off frequency $f_{L1}$ to the cut-off frequency $f_{L2}$. A range $f_{L2}-f_{L1}=500$ MHz to 1 GHz is preferred. The frequencies $f_{L1}$ and $f_{L2}$ are smaller than the optical frequency $f_{Lo}$ of the Lo-Laser 6 and encompass a frequency range of a width $\Delta f_{ZF}$ around the frequency $f_{LM}$ which is smaller than the Lo-frequency $f_{Lo}$ by an amount equal to the transmission frequency of the bandpass filter 8, namely the intermediate frequency $f_{ZF}$. Only the frequencies within the frequency band $\Delta f_{ZF}$ form during the time interval $\tau_s$ back-scatter signals of this type, which after the Lo-frequency $f_{Lo}$ has been superimposed on them, result in evaluatable output signals of the bandpass filter 8. The spacing between the cut-off frequencies $f_{L1}$ and $f_{L2}$ can be chosen to be so great that the frequency range $\Delta f_{ZF}$ is sufficiently far removed from the cut-off frequency $f_{L1}$ and $f_{L2}$, so that temperature and/or tolerance-determined fluctuations of the cut-off frequencies may be permitted, if possible without a design effort and cost for a control. On the other hand the time difference $t_2-t_1$ must not be chosen such that they are unnecessarily much greater than the useful transmission period $\tau_s$ to avoid unnecessary loading of the transmission laser 1.

Figure 3:
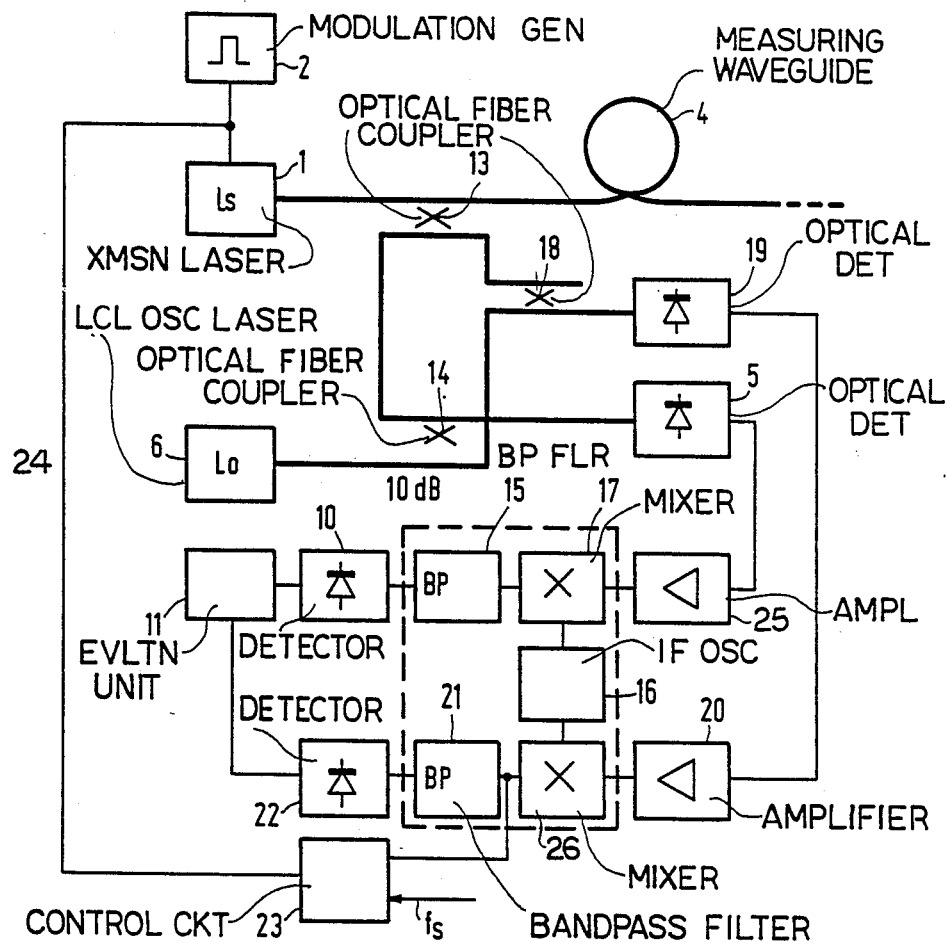
FIG. 3 shows a modified embodiment of the invention without optical isolators and with additional drive and control elements.

The arrangement shown in FIG. 3 which is a modification of the arrangement shown in FIG. 1 does not require optical isolators. Consequently it is not necessary to connect any optical elements radiating in the unbound-mode. The optical fiber couplers 13 and 14 are inserted such that light from the transmission laser 1 cannot read the Lo-laser 6 nor can light from the Lo-laser 6 reach the transmission laser.

The detection and evaluation of the back-scattered signals is basically effected as in the arrangement shown in FIG. 1. The electric output signal of the detector 5 is conveyed via the amplifier 25 to the bandpass filter 15 whose intermediate-frequency output signal is detected and evaluated.

To reduce the bandwidth of the bandpass filter 15, more specifically at high values of the intermediate frequency $f_{ZF}$ this filter is in a form of a tracking filter. By means of the IF-oscillator 16 and the mixer 17 a further frequency conversion is effected into a range in which the bandpass 15 can easily be implemented with a narrow bandwidth.

In the practical example shown in FIG. 3 further switching circuits are provided which, if so required, enable advantageous additional drive and control functions and which can be provided according to the requirements. The photodetector 19 receives a portion of the light of the Lo-laser 6 from the optical fiber couplers 13 and 14, on which light a portion of the transmission light of the transmission laser 1 is superimposed by the coupler 18. The intermediate-frequency output signal detected by the electric detector 22 via the amplifier 20 and the bandpass filter 21 is applied to the evaluation circuit 11. The bandpass filter 21 is tuned to the same intermediate frequency and bandwidth as the bandpass filter 15. Its bandwidth is also narrowed by the addition of the intermediate frequency, or IF, oscillator 16 via the mixer 26.

The output signal of the electric detector 22 appears earlier and whithout ambiguity than the output signal of the detector 10 which is delayed by the back-scatter time difference and is consequently suitable for triggering the evaluation circuit 11.

This is particularly important when the instant at which the intermediate-frequency back-scatter signal appears is not accurately defined.

In the event of any deviation from a nominal frequency $f_s$ it is possible to readjust the chirp-range of the transmission laser 1 via the electric line 24, using a control circuit 23.

What is claimed is:

1. An optical time domain reflectometer arrangement having heterodyne reception for determining attenuation of an optical measuring waveguide comprising
   first laser means for transmitting laser light pulses, said laser light pulses passing in consecutive time intervals, $t_1$ to $t_2$, with a light frequency varying between two cutoff frequencies, $f_{L1}$ and $f_{L2}$,
   second laser means for transmitting continuous light at a frequency $f_{LO}$, said frequency $f_{LO}$ being outside a range between said cutoff frequencies, $f_{L1}$ and $f_{L2}$, and said frequency $f_{LO}$ differing from a frequency value $f_{LM}$ between said cutoff frequencies, $f_{L1}$ and $f_{l2}$, by an amount equal to a frequency $f_{ZF}$,
   control means for monotonically varying control current for said first laser means, said control current being monotonically varied for each back-scattered light pulse between said time intervals $t_1$ and $t_2$,
   optical waveguide means for receiving at least portions of said laser light pulses,
   at least one detector means receiving at least said continuous light for providing electrical signals, and
   circuit means for filtering and evaluating intermediate ones of said electrical signals.

2. An arrangement according to claim 1, wherein said control current is varied from zero to a maximum value between said time intervals $t_1$ and $t_2$.

3. An arrangement according to claim 1, wherein said control current is amplitude modulated.

4. An arrangement according to claim 1, claim 2 or claim 3, further comprising first optical means for conveying said laser light pulses in a first direction into said optical waveguide means, and second optical means for conveying said continuous light in a second opposite direction to said first direction into said at least one detector means, wherein said first optical means includes a first optical isolator and an optical fiber coupler having multiple light paths, said laser light pulses being conveyed through a first direct path of said multiple light paths of said optical fiber coupler to said optical waveguide means, and wherein said second optical means includes a second optical isolator conveying said continuous light through a second direct path of said multiple light paths of said optical fiber coupler in said second opposite direction.

5. An arrangement according to claim 4, wherein said control means are disposed to reduce deviations of a "chirp" range between said cutoff frequencies, $f_{L1}$ and $f_{L2}$.

6. An arrangement according to claim 4, wherein said cutoff frequencies $f_{L1}$ and $f_{L2}$ have a difference value between 300 MHz and 2 GHz.

7. An arrangement according to claim 4, wherein said frequency $f_{ZF}$ has a value between 0.5 and 15 GHz.

8. An arrangement according to claim 4, wherein said circuit means includes bandpass filters with at least one of said bandpass filters being a tracking filter.

9. An arrangement according to claim 1, claim 2, or claim 3, further comprising first optical means for conveying said laser light pulses into said optical waveguide means by a direct path of a first optical fiber coupler, wherein a portion of an optical back-scattered signal from said first optical fiber coupler is conveyed together with said continuous light of said second laser to said at least one detector means by a second optical fiber coupler.

10. An arrangement according to claim 9, wherein said first laser means provides a partial light beam, said partial light beam being superposed by a portion of said continuous light, and wherein said partial light beam and said portion are applied to a second detector means, said detector means including a photodetector having electrical output signals triggering said circuit means, said circuit means evaluating said backscattered signal.

11. An arrangement according to claim 9, wherein said control means are disposed to reduce deviations of a "chirp" range between said cutoff frequencies, $f_{L1}$ and $f_{L2}$.

12. An arrangement according to claim 9, wherein said cutoff frequencies, $f_{L1}$ and $f_{L2}$, have a difference value between 300 MHz and 2 GHz.

13. An arrangement according to claim 9, wherein said frequency $f_{ZF}$ has a value between 0.5 and 15 GHz.

14. An arrangement according to claim 9, wherein said circuit means includes bandpass filters with at least one of said bandpass filters being a tracking filter.

15. An arrangement according to claim 1, wherein said control means are disposed to reduce deviations of a "chirp" range between said cutoff frequencies, $f_{L1}$ and $f_{L2}$.

16. An arrangement according to claim 1, wherein said cutoff frequencies, $f_{L1}$ and $f_{L2}$, have a difference value between 300 MHz and 2 GHz.

17. An arrangement according to claim 1, wherein said frequency $f_{ZF}$ has a value between 0.5 and 15 GHz.

18. An arrangement according to claim 1, wherein said circuit means includes bandpass filters with at least one of said bandpass filters being a tracking filter.

* * * * *